United States Patent [19]

Cheeseman

[11] 3,792,768
[45] Feb. 19, 1974

[54] EGG ACCUMULATION CONVEYOR
[75] Inventor: William C. Cheeseman, Chino, Calif.
[73] Assignee: FMC Corporation, San Jose, Calif.
[22] Filed: Oct. 10, 1972
[21] Appl. No.: 296,413

[52] U.S. Cl. ................................................ 198/30
[51] Int. Cl. ............................................. B65g 47/26
[58] Field of Search .............................. 198/30, 204

[56] References Cited
UNITED STATES PATENTS
3,236,363   2/1966   Sutliffe .............................. 198/204

*Primary Examiner*—Richard E. Aegerter
*Attorney, Agent, or Firm*—Robert S. Kelly; C. E. Tripp

[57] ABSTRACT

An egg accumulation conveyor includes an endless conveyor belt adapted to receive the eggs at one end and to convey them to the other end while allowing the eggs to accumulate if they cannot be removed from the downstream end at a fast enough rate. A plurality of generally flat slats in a spaced and aligned arrangement are placed atop the belt to relieve the forward conveying pressure on the eggs as they accumulate to thereby prevent damage to the eggs. The slats are formed with non-linear portions at their downstream ends to further relieve the conveyor pressure on the accumulated eggs. Also at the downstream end of the belt means are provided for channeling the eggs into lanes so that they can be removed from the accumulation conveyor in rows and at a predetermined discharge rate.

11 Claims, 3 Drawing Figures

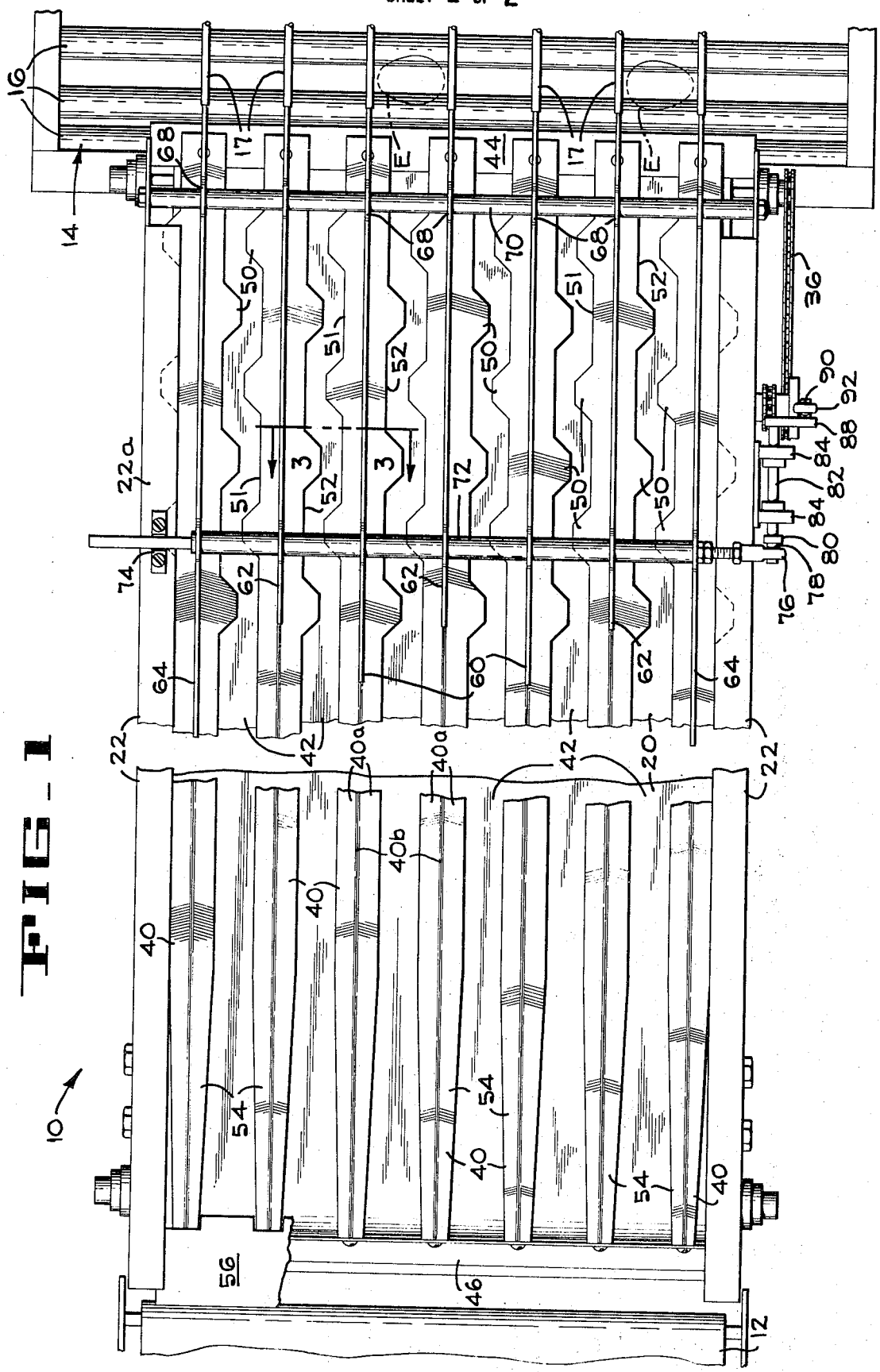
FIG_1

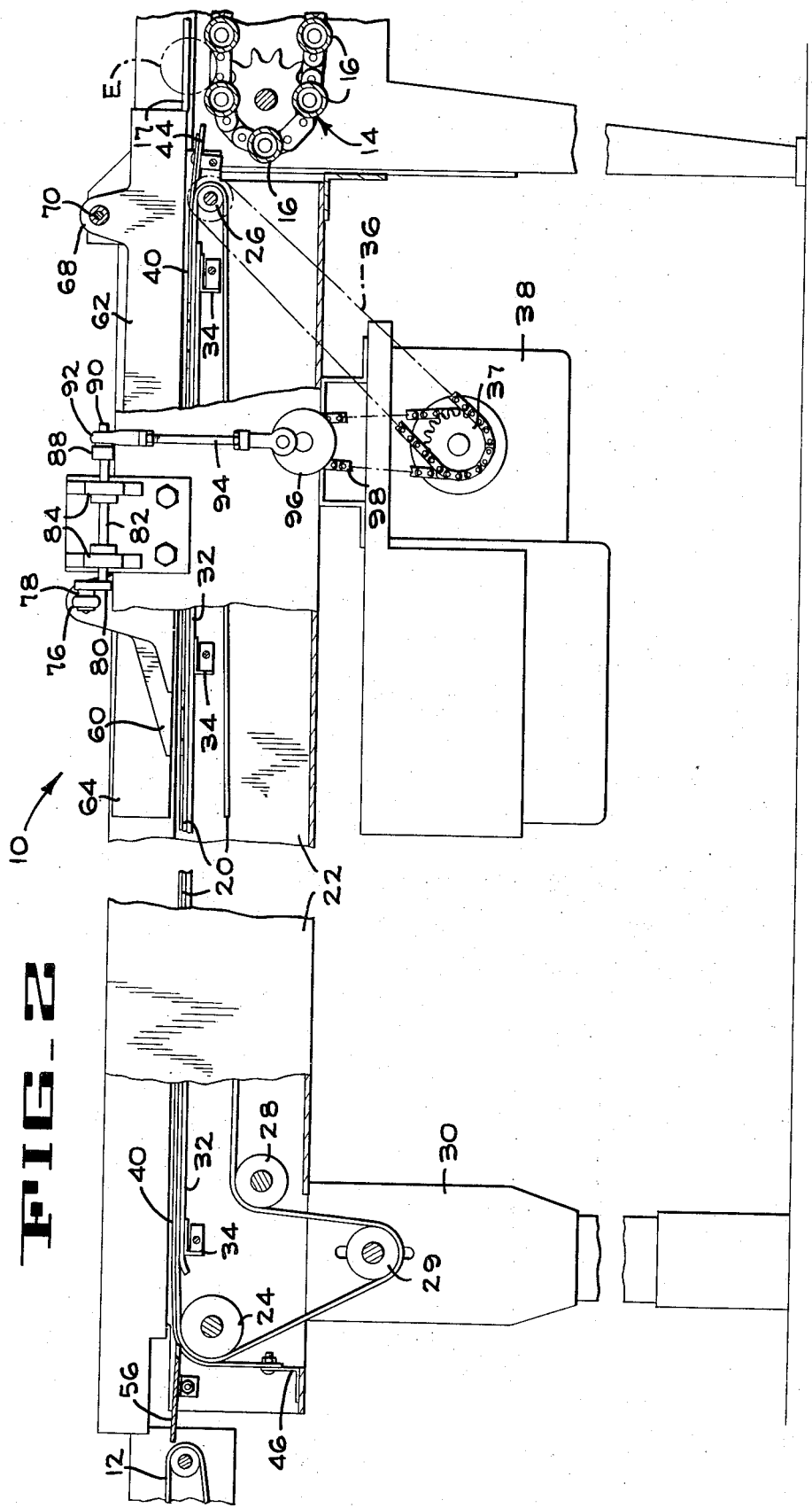

3,792,768

EGG ACCUMULATION CONVEYOR

BACKGROUND OF THE INVENTION

1. Field of the Invention

This invention pertains to article accumulating and feeding systems, and more particularly, it pertains to systems for accumulating fragile articles such as eggs and feeding the same in uniformly spaced and aligned rows to conventional egg conveyors or other egg handling equipment.

2. Description of the Prior Art

In handling bulk quantities of articles it sometimes becomes necessary to provide an accumulator, or a temporary storage reservoir, wherein indeterminate numbers of the articles may be allowed to accumulate while they are fed at a controlled rate from one end thereof. When the articles are fragile in nature the design and operation of such accumulators poses problems. For example, in a system for the handling of eggs it is necessary to uniformly align and space the same on conveyors moving at uniform rates of speed in order that such eggs can be washed, graded, and packed. However, an egg handling system may receive eggs, from hen houses for example, at widely varying input rates. In order to render the entire conveying system efficient, an egg accumulating device is required in some portion of the system.

As is well known, eggs must be treated with a rather high level of care since rough handling may break the thin egg shells the result of which would be not only the loss of the broken eggs but also the creation of a disagreeable mess which would necessitate the stopping of the entire conveying system to allow time for cleaning. It has heretofore been somewhat of a problem to provide a conveying system which would allow accumulation without at the same time permitting undue pressures to be built up within the mass of accumulated eggs. The accumulator must also operate without slowing the overall egg handling system, and this requirement further complicates the solution to the aforedescribed problem.

One prior art solution to the problem of accumulating and feeding eggs is shown in the U.S. Pat. to Page et al. No. 2,836,161, issued on June 10, 1958. An accumulator is there shown in which a soft flexible cover sheet is provided to allow indeterminate numbers of eggs to be accumulated. Running beneath the surface of the sheet and in continuous engagement therewith is an endless conveyor which is comprised of a series of spaced rollers that urge the eggs forwardly on the sheet to a position where they can be singulated and fed to further processing equipment. Since the endless conveyor is not directly in contact with the eggs and acts only through the flexible cover sheet, the pressure on the eggs is not so great as to permit the eggs to break.

An improved egg accumulating and transferring system is disclosed in the U.S. Pat. to Bliss No. 3,139,176, issued on June 30, 1964. In this patent an accumulation conveyor system is disclosed which includes a stationary platform or table upon which a group of eggs may be allowed to accumulate. An endless conveyor comprised of a series of uniformly spaced and aligned slats is arranged to move over the flat surface of the table. The slats are relatively thin so that they engage the eggs only at the lowermost portions thereof, and, when the input to the table exceeds the output therefrom, eggs will be permitted to accumulate with the thin conveying slats sliding under the accumulated eggs without doing any damage thereto.

While the latter prior art accumulator has enjoyed some popularity in the egg handling field, it requires a specialized spaced slat conveyor which adds expense to the egg handling system. Furthermore, the thin slats must be carefully designed if damage to the eggs is to be avoided. There has, therefore, been a search for a simplified and yet fully effective system to provide for the accumulating of fragile articles, particularly eggs.

SUMMARY OF THE INVENTION

By the present invention means are provided whereby eggs, or other fragile articles, can be allowed to continuously accumulate in a mass while they are being moved within a conveying system. The invention basically comprises only simple, relatively inexpensive components which include a conveyor belt having a flat conveying surface which receives the eggs, or other fragile articles, and conveys them forwardly.

Positioned directly adjacent to the conveying surface are a series of generally flat slats which are mounted in stationary positions in an aligned and spaced arrangement and which cover a large portion of the conveying surface at the downstream end thereof. Once the eggs are received upon the conveying surface they will be propelled forwardly, and when they move over the stationary slats the direct conveying pressure from the belt will be relieved. Thus, these slats allow conveying pressure on the eggs to be reduced so that undue pressures will not be built up if a large number of eggs should accumulate at the discharge end of the conveyor since a significant percentage of such eggs will be received upon the slats rather than upon the underlying conveyor belt.

A feature of the present invention is the fact that the slats are provided with non-linear portions so that the conveying forces cannot be directly transmitted through a continuous line of articles aligned in the direction of movement of the belt. Thus, as an article is moved forwardly by the belt it will, in its normal movement, be passed over the stationary slats to relieve the direct driving pressure on this article.

As with the aforedescribed accumulators of the prior art, channeled lanes are provided at the discharge end of the conveyor so that the eggs, or other fragile articles may be transferred in predetermined spaced positions and at a rate as determined by the conveyor or other apparatus which receives the articles from the accumulator.

BRIEF DESCRIPTION OF THE DRAWINGS

FIG. 1 is a plan view of the egg accumulation conveyor of the present invention.

FIG. 2 is a side elevation of the apparatus of FIG. 1 with portions thereof being broken away for the purpose of better illustrating the structure of the invention.

FIG. 3 is an enlarged section taken along the line 3—3 of FIG. 1 and illustrates the manner in which an egg is received on the accumulation conveyor of the present invention.

DESCRIPTION OF THE PREFERRED EMBODIMENT

The accumulation conveyor 10 of the present invention will be seen to comprise an apparatus which is adapted to receive fragile articles — in the described embodiment eggs E — at random from a continuously operating endless belt conveyor 12. The accumulation conveyor moves the eggs over a predetermined distance and discharges them to an egg aligning conveyor 14 which is comprised of a series of spaced parallel bars 16 that form pockets for the eggs. Alignment conveyor 14 also includes a plurality of spaced and aligned guide rods 17 requiring the eggs to be discharged from the accumulation conveyor in spaced and aligned arrangements and at a rate as determined by the rate of movement of the bars 16 of the egg aligning conveyor 14.

The egg accumulation conveyor 10 will be seen to comprise an endless conveyor belt 20 of conventional material such as rubberized fabric or the like. The conveyor belt is mounted between a pair of side frame members 22 and is trained about a guide roller 24 at its upstream end and about a driving roller 26 at its downstream end (FIG. 2). The lower run of the conveyor belt is received about a pair of idler rollers 28 and 29 the latter being adjustably mounted upon a supporting post 30 of the frame structure so that the conveyor belt can be properly tensioned for conveying the eggs from the input conveyor 12 to the discharge conveyor 14. The upper run of the conveyor belt is supported upon a flat plate 32 which is secured to the side frame members 22 by angle brackets 34 (FIG. 2) and which extends across the width of the conveyor belt between the side frame members. During the accumulating operation the conveyor belt will be continuously driven from the drive roller 26 by means of a drive chain 36 which is in driving engagement with a sprocket 37 that is attached to the drive shaft of motor 38 located beneath and supported by the side frame members 22.

The primary novel feature of the present invention is the provision of a series of aligned stationary slats 40 which are positioned atop the upper run of the conveyor belt 20 so as to provide a means for relieving the forward conveying pressure on the eggs that are passing through the accumulation conveyor. The slats 40, as best seen in FIG. 1, are spaced laterally across the conveying surface of the conveyor belt so that narrow conveying channels 42 are provided for permitting positive conveying forces to be transferred to the eggs. At the downstream end of the accumulator, where eggs will first accumulate, it will be noted (FIG. 1) that the major portion of the conveyor belt surface is covered by the slats. The slats are secured in their fixed positions by means of a flat plate 44 at the discharge end of the apparatus which is fixedly mounted to each of the side frame members 22 so as to extend across the discharge lip of the conveyor belt 20 directly below the level of the conveying surface. The leading ends of the slats are bolted or otherwise rigidly attached to the plate 44. It will be noted from FIG. 2 that this plate also serves as an inclined ramp to direct the discharged eggs from the accumulator of the present invention to the discharge conveyor 14. The trailing ends of each of the slats at the upstream end of the apparatus are trained around the guide roller 24 along with the conveyor belt 20 (FIG. 2) and are attached to an angle member 46 which extends between and is secured to the side frame members 22 of the apparatus.

Each slat has a slightly crowned configuration, as best seen in FIG. 3, so that the upper egg-receiving surface thereof may be said to be comprised of a pair of side portions 40a which are joined together at an apex 40b in the center of the slat. This crowned upper surface of each slat will cause an unimpeded egg to roll from the slat and will prevent an egg from remaining on a slat for an indefinte period of time unless it is in an accumulated mass of eggs. A significant design feature of the slats is best illustrated in FIG. 1 where it will be seen that the downstream end of each slat is provided with projecting portions 50 which extend laterally from the aligned side edges 51 and 52 of the slat. The projecting portions are offset on the opposite side edges 51 and 52 of the slat so that adjacent slats will cause the thus formed interposed conveying channel 42 to follow a serpentine course at the downstream end of the accumulator. It will be recognized that the non-linear configuration of the downstream end of the slats, as provided by the offset projections 50, serves to relieve the conveying pressure on the eggs since each egg will be caused to move over and be supported by the slats in their normal path of travel at the downstream end of the conveyor. When a mass of eggs accumulate, a certain percentage of the eggs will be received upon the slats rather than upon the conveyor belt, and direct driving pressure will not be applied to these eggs.

At the upstream end of the accumulator apparatus 10 the slats are provided with tapered portions 54 so as to widen the associated conveying channels 42. Thus, as eggs are delivered to the accumulator, over a narrow inlet ramp 56 that bridges the gap between the feed conveyor 12 and the upstream end of the conveyor belt 20, such eggs will be ultimately received upon the conveyor belt and channeled into the narrowing conveying lanes 42 by the slats. The spacing and dimensional relationships of the slats are such that only a single line of eggs will be received between each pair of adjacent slats at the downstream end of the apparatus; thus, a row of generally uniformly spaced eggs can be fed to the alignment conveyor 14.

Positioned at the downstream end of the accumulator apparatus 10 is a device for assuring the proper channeling of the eggs before they are fed to the discharge conveyor 14. This device includes a plurality of flat plates 60,62 and 64 of differing lengths which plates are arranged in parallel relationship and in vertical orientations. Each plate is aligned with the apex 40b of an underlying slat so that the plates are centered directly over the slats. As seen in FIG. 1, the plates thereby form channels coextensive with the conveying channels 42. The spacing of the plates is such that only one line of eggs will pass therebetween so long as the eggs are oriented with their major axes generally perpendicular to the direction of movement of the conveyor belt 20. This orientation will be assured by the narrow sinuate conveying paths which will tend to spin any eggs which have their major axes aligned in a direction parallel to the direction of movement of the conveyor belt.

Each of the guide plates 60,62 and 64 is provided with an upstanding ear 68 which pivotally mounts the associated plate to a bar 70 that extends across the accumulator apparatus 10 at the downstream end thereof. The upstream ends of each of the plates 60,62 and 64 are rotatably received upon a second transversely extending bar 72 one end of which is slidably received in a mounting bracket 74 positioned atop an inturned flange 22a of one of the side frame members 22. The opposite end of the bar 72 is provided with a rod end bearing 76 which rotatably receives a crank pin 78. The crank pin is attached to a crank 80 which is, in turn, eccentrically fixed upon a crank shaft 82 that is rotatably supported by a pair of bearing blocks 84 secured to one of the side frame members 22 of the apparatus. The downstream end of the crank shaft 82 is secured to a second crank 88 the distal end of which carries a crank pin 90. This latter crank pin is rotatably received within a rod end bearing 92 which permits both rotational and pivotal movement of the pin relative to the bearing. The rod end bearing is received upon the end of a crank shaft 94 the lower end of which is pivotally connected to the crank plate 96. As best seen in FIG. 2, the crank plate is adapted to be continuously driven by the main drive motor 38 through a drive chain 98.

It will be recognized from the foregoing description that the continuous rotation of crank plate 96 will result in a vertical reciprocation of the crank shaft 94 which will in turn, cause an oscillation of the crank shaft 82 through an approximate 90° angular movement. This, in turn, will impart a like pivotal oscillation to the crank pin 78 so as to cause one end of the bar 72, which supports the guide plates 60,62 and 64, to reciprocate in a downward and sideward motion. As the eggs are conveyed across the accumulator apparatus by the conveyor belt 20, the transverse oscillating movement of the inclined upstream edges of the plates 60,62 and 64 will cause the eggs to move into the conveying channels at the downstream end of the apparatus and will prevent eggs from bridging at the upstream edges of the guide plates.

While the apparatus is shown as being used to transfer eggs in spaced and aligned arrangments to an egg aligning device 14, it will be appreciated that many other egg handling or conveying devices could be used to remove the eggs from the accumulator.

From the foregoing description it will be seen that an accumulation conveyor is provided which will allow an indeterminate number of eggs or other fragile articles to be accumulated while permitting a selective controlled removal of the articles. The provision of the thin slats upon the conveying surface relieves the excess conveying pressures in the accumulated mass of eggs, and thereby assures the safety of these fragile articles.

Although the best mode contemplated for carrying out the present invention has been herein shown and described, it will be apparent that modification and variation may be made without departing from what is regarded to be the subject matter of the invention.

I claim:

1. An accumulator for fragile articles such as eggs comprising an endless belt having a flat conveying surface arranged in a generally horizontal plane with a receiving end and a discharge end, means for continuously moving said belt to transport said articles on said conveying surface from said receiving end to said discharge end thereof, a plurality of slats having generally flat shapes and being arranged in laterally spaced and generally aligned relationship, and means for mounting said slats in stationary positions with their flat surface directly adjacent to said conveying surface of the belt, said slats each having a relatively small dimension in the vertical plane so that eggs moving in a horizontal direction on said belt may easily pass over said slats, said slats covering a large portion of said conveying surface adjacent said discharge end thereof, said slats having side edge portions at said discharge end of said conveying surface which are non-linear with respect to the direction of movement of said belt to cause said articles to travel over said slats during the normal course of their movement with said belt so as to relieve the conveying pressure on said articles and allow them to accumulate at said discharge end of the belt without damage thereto.

2. An accumulator as set forth in claim 1 wherein said slats cover the major portion of said conveying surface adjacent said discharge end thereof.

3. An accumulator as set forth in claim 1 wherein said slats are arranged so as to form article conveying lanes on said conveying surface, said non-linear portions of said slats causing said lanes to extend in a serpentine fashion at said discharge end of said conveying surface.

4. An accumulator as set forth in claim 1 wherein each of said slats has an upper surface with a slight crown thereto so as to prevent an article of rounded shape from coming to rest thereon.

5. An accumulator as set forth in claim 3 including means at said discharge end of said conveying surface for directing said articles in singulated fashion into said lanes including a plurality of guide members extending above said slats and being generally centered on and in alignment therewith.

6. An accumulator as set forth in claim 5 wherein each of said guide members comprises a flat plate oriented in a generally vertical plane.

7. An accumulator as set forth in claim 6 wherein said means for directing articles into said lanes further includes means for oscillating the upstream ends of said guide members in a direction transverse to the direction of movement of said conveying surface.

8. An accumulator for fragile articles such as eggs comprising a flat conveying surface having a receiving end and a discharge end, means for moving articles at random onto said receiving end of the conveying surface, means for continuously moving said conveying surface to transport said articles from said receiving end to said discharge end thereof, means at said discharge end for removing articles from said conveying surface in spaced and aligned arrangements and at a uniform rate, a plurality of generally flat slats arranged in laterally spaced and generally aligned relationship on said conveying surface so as to form article conveying lanes thereon, and means for mounting said slats in stationary positions upon said conveying surface, said slats covering a large portion of said conveying surface adjacent said discharge end thereof, said slats having non-linear portions at said discharge end of said conveying surface to cause said articles to travel over said slats during the normal course of their movement with said conveying surface so as to relieve the conveying pressure on said articles and allow them to accumulate at said article removing means without damage thereto.

9. An accumulator for fragile articles as set forth in claim 8 wherein said slats cover the major portion of said conveying surface adjacent said discharge end thereof.

10. An accumulator for fragile articles as set forth in claim 9 wherein said non-linear portions of said slats cause said lanes to extend in a serpentine fashion at said discharge end of said conveying surface.

11. An accumulator as set forth in claim 10 wherein each of said slats has an upper surface with a slight crown thereto so as to prevent an article of rounded shape from coming to rest thereon.

* * * * *

UNITED STATES PATENT OFFICE
CERTIFICATE OF CORRECTION

PATENT NO. : 3,792,768

DATED : February 19, 1974

INVENTOR(S) : WILLIAM C. CHEESEMAN

It is certified that error appears in the above-identified patent and that said Letters Patent are hereby corrected as shown below:

Column 1, line 44, "2,836,161" should be --2,838,161--.

Column 5, line 58, "surface" should be --surfaces--.

Signed and Sealed this sixteenth Day of December 1975

[SEAL]

Attest:

RUTH C. MASON
Attesting Officer

C. MARSHALL DANN
Commissioner of Patents and Trademarks